(12) United States Patent
Lee

(10) Patent No.: US 11,037,130 B2
(45) Date of Patent: Jun. 15, 2021

(54) MOBILE PAYMENT SYSTEM FOR MAPPING IDENTIFICATION INFORMATION TO DYNAMIC CODE OF BUYER USING SOUND WAVE

(71) Applicant: MOBIDOO CO., LTD., Seoul (KR)

(72) Inventor: David Yun Hee Lee, Seoul (KR)

(73) Assignee: MOBIDOO CO., LTD., Seoul (KR)

( * ) Notice: Subject to any disclaimer, the term of this patent is extended or adjusted under 35 U.S.C. 154(b) by 70 days.

(21) Appl. No.: 16/345,249

(22) PCT Filed: Nov. 13, 2017

(86) PCT No.: PCT/KR2017/012793
§ 371 (c)(1),
(2) Date: Apr. 26, 2019

(87) PCT Pub. No.: WO2018/147530
PCT Pub. Date: Aug. 16, 2018

(65) Prior Publication Data
US 2019/0272527 A1    Sep. 5, 2019

(30) Foreign Application Priority Data

Feb. 13, 2017  (KR) .................. 10-2017-0019199
Apr. 24, 2017  (KR) .................. 10-2017-0052254

(51) Int. Cl.
*G06Q 20/32* (2012.01)
*G06Q 20/20* (2012.01)
(Continued)

(52) U.S. Cl.
CPC ....... *G06Q 20/3272* (2013.01); *G06Q 20/209* (2013.01); *G06Q 20/3223* (2013.01); *G06Q 20/382* (2013.01); *G10L 25/51* (2013.01)

(58) Field of Classification Search
None
See application file for complete search history.

(56) References Cited

U.S. PATENT DOCUMENTS

2002/0191765 A1*  12/2002  Labaton ............ G06Q 20/4097
                                               379/201.01
2004/0236699 A1*  11/2004  Beenau ............. G06K 9/00382
                                               705/64
(Continued)

FOREIGN PATENT DOCUMENTS

JP    2007323249    12/2007
JP    2014229137    12/2014
(Continued)

OTHER PUBLICATIONS

"International Search Report (Form PCT/ISA/210) of PCT/KR2017/012793," dated Feb. 1, 2018, with English translation thereof, pp. 1-4.

*Primary Examiner* — Oluseye Iwarere
(74) *Attorney, Agent, or Firm* — JCIPRNET

(57) ABSTRACT

A method of operating a service server is disclosed. One embodiment comprises the steps of: receiving, from a payment application server, identification information obtained by a buyer's terminal and dynamic code information created by a request of the buyer's terminal; determining whether or not the obtained identification information is valid; on the basis of the determining result, mapping the obtained identification information to the dynamic code information; and transmitting the mapping information created on the basis of the mapping to the payment application server.

12 Claims, 17 Drawing Sheets

(51) Int. Cl.
*G10L 25/51* (2013.01)
*G06Q 20/38* (2012.01)

(56) References Cited

U.S. PATENT DOCUMENTS

| | | | | | |
|---|---|---|---|---|---|
| 2011/0270764 | A1* | 11/2011 | Mizani Oskui | ...... | G06Q 20/401 705/75 |
| 2012/0150669 | A1* | 6/2012 | Langley | ............... | G06Q 20/102 705/16 |
| 2012/0185398 | A1* | 7/2012 | Weis | .................... | G06Q 20/401 705/75 |
| 2013/0203345 | A1* | 8/2013 | Fisher | ................ | G06Q 20/3229 455/41.1 |
| 2014/0229379 | A1* | 8/2014 | Jang | .................... | G06Q 20/385 705/44 |
| 2015/0046329 | A1* | 2/2015 | Huxham | ............ | G06Q 20/4014 705/44 |
| 2015/0149365 | A1* | 5/2015 | Mobini | ................ | G06Q 20/382 705/75 |
| 2015/0278811 | A1* | 10/2015 | Lalchandani | .......... | G06Q 20/40 705/42 |
| 2015/0310416 | A1* | 10/2015 | Akashika | ............... | G06Q 20/36 705/39 |
| 2016/0314453 | A1* | 10/2016 | Rogers | ............... | G06Q 20/3272 |
| 2016/0379206 | A1* | 12/2016 | Lee | ...................... | G06Q 20/308 705/40 |
| 2017/0186000 | A1* | 6/2017 | Akashika | ............. | G06Q 20/367 |
| 2017/0228720 | A1* | 8/2017 | Vaysman | ............. | G06Q 20/204 |
| 2017/0287061 | A1* | 10/2017 | Chae | ................... | G06Q 20/3276 |
| 2017/0300904 | A1* | 10/2017 | Chung | .................... | G06Q 20/20 |
| 2017/0357972 | A1* | 12/2017 | Van Os | ................... | G06Q 20/386 |
| 2017/0372313 | A1* | 12/2017 | Kim | .................... | G06Q 20/3821 |
| 2018/0108001 | A1* | 4/2018 | Taylor | .................. | G06Q 20/206 |
| 2018/0175966 | A1* | 6/2018 | Kim | ........................ | H04K 3/827 |
| 2018/0240123 | A1* | 8/2018 | Jin | ................... | G06Q 20/40145 |
| 2018/0268409 | A1* | 9/2018 | Guo | .................... | G06K 19/06 |
| 2018/0285868 | A1* | 10/2018 | O'Hara | ................. | G06Q 20/401 |
| 2019/0066090 | A1* | 2/2019 | Mei | ........................ | H04W 4/80 |
| 2019/0114618 | A1* | 4/2019 | Zhao | .................... | G06Q 20/227 |
| 2019/0272527 | A1* | 9/2019 | Lee | .................... | G06Q 20/327 |
| 2020/0082378 | A1* | 3/2020 | Woo | .................. | G06F 16/9554 |
| 2020/0236547 | A1* | 7/2020 | Flanagan | ........... | G06Q 20/3272 |

FOREIGN PATENT DOCUMENTS

| | | |
|---|---|---|
| KR | 1020120100283 | 9/2012 |
| KR | 1020130065789 | 6/2013 |
| KR | 1020160065260 | 6/2016 |
| KR | 1020160077467 | 7/2016 |
| KR | 1020160039369 | 10/2016 |
| KR | 101707614 | 2/2017 |
| WO | 2015135384 | 9/2015 |

* cited by examiner

MOBILE PAYMENT SYSTEM FOR MAPPING IDENTIFICATION INFORMATION TO DYNAMIC CODE OF BUYER USING SOUND WAVE

TECHNICAL FIELD

One or more example embodiments relate to a mobile payment system.

BACKGROUND ART

Recently, services requiring offline authentication using a mobile terminal in association with a mobile payment, membership, and tickets are based on information on a barcode or a quick response (QR) code. The offline authentication using a barcode or the QR code may require a reader or a scanner. This may be an obstacle to an expansion of the service because additional costs and tasks for purchasing and installing the reader are required to apply the service to a merchant.

In a related art, Korean Patent Application No. 10-2016-0039369 (title: SYSTEM FOR PERFORMING PAYMENT PROCESS AND METHOD FOR CONTROLLING THE SAME, applicant(s): DANAL CO., LTD.) filed on Oct. 1, 2014 and published on Apr. 1, 2016 discloses a system control method including: displaying, by a service terminal, information on a product; transmitting a payment request signal of the product from the service terminal to a second server via a first server; generating, by the first server or the second server, a 2D barcode mapped to at least one item of URL information; transmitting the generated 2D barcode to the service terminal; and displaying, by the service terminal, the generated 2D barcode, wherein when the displayed 2D barcode is recognized by a mobile device, the mobile device displays a standard payment window for a payment of the product based on the mapped URL information.

DISCLOSURE OF INVENTION

Technical Solutions

According to an aspect, a method of operating a service server includes receiving, from a payment application server, identification information acquired by a buyer terminal and dynamic code information of the buyer terminal, wherein the buyer terminal is configured to acquire the identification information based on a sound wave output from a seller terminal and transmit the acquired identification information to the payment application server, determining whether the acquired identification information is valid, mapping the acquired identification information and the dynamic code information based on a result of the determining, and transmitting, to the payment application server, mapping information generated based on the mapping such that a payment processing is performed by the payment application server having received a transaction authentication request from the seller terminal.

When the transaction authentication request, merchant information, and transaction amount information are received from the seller terminal, the payment application server may be configured to generate a payment request based on one-time information corresponding to the dynamic code information in the mapping information, the merchant information, and the transaction amount information.

The method may further include transmitting, to the payment application server, a security key used for shuffling a sequence corresponding to the sound wave.

The payment application server may be configured to transmit the security key to the seller terminal.

The method may further include issuing identification information for the seller terminal when an identification information provision request of the seller terminal is received from the payment application server and transmitting the issued identification information to the payment application server, wherein the payment application server may be configured to transmit the issued identification information to the seller terminal such that the seller terminal generates a sound wave based on the issued identification information.

The method may further include generating, when identification information for the seller terminal is issued, a sequence including the issued identification information and shuffling the sequence using a security key shared with the buyer terminal and transmitting the shuffled sequence to the payment application server.

The buyer terminal may be configured to determine a sequence corresponding to the sound wave, shuffle the sequence using a security key shared with the service server, and acquire identification information from the shuffled sequence.

A sound wave intensity-associated event may occur when a sound wave intensity to value measured in the buyer terminal is greater than or equal to a threshold sound-wave intensity value.

When the sound wave intensity-associated event does not occur, the buyer terminal may perform a first operation or a second operation. The first operation may be an operation in which the buyer terminal does not acquire the identification information even if the sound wave is received. The second operation may be an operation in which the buyer terminal acquires the identification information based on the sound wave and does not request the payment application server to verify a validity of the acquired identification information.

According to another aspect, a service server includes a communication interface and a controller configured to receive, from a payment application server, identification information acquired by a buyer terminal and dynamic code information of the buyer terminal, wherein the buyer terminal is configured to acquire the identification information based on a sound wave output from a seller terminal and transmit the acquired identification information to the payment application server, determine whether the acquired identification information is valid, map the acquired identification information and the dynamic code information based on a result of the determining, and transmit, to the payment application server, mapping information generated based on the mapping such that a payment processing is performed by the payment application server having received a transaction authentication request from the seller terminal.

Effects

According to example embodiment, it is possible to improve a payment convenience by performing a payment processing when a buyer brings a terminal of the buyer close to a seller terminal. According to example embodiments, it is possible to facilitate a service expansion of a service provider by allowing the service provider to easily and quickly integrate a sound wave solution with a payment system.

BEST MODE FOR CARRYING OUT THE INVENTION

Hereinafter, example embodiments will be described in detail with reference to the accompanying drawings.

It should be understood, however, that there is no intent to limit this disclosure to the particular example embodiments disclosed. On the contrary, example embodiments are to cover all modifications, equivalents, and alternatives falling within the scope of the example embodiments.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Also, in the description of embodiments, detailed description of well-known related structures or functions will be omitted when it is deemed that such description will cause ambiguous interpretation of the present disclosure.

Figure 1:
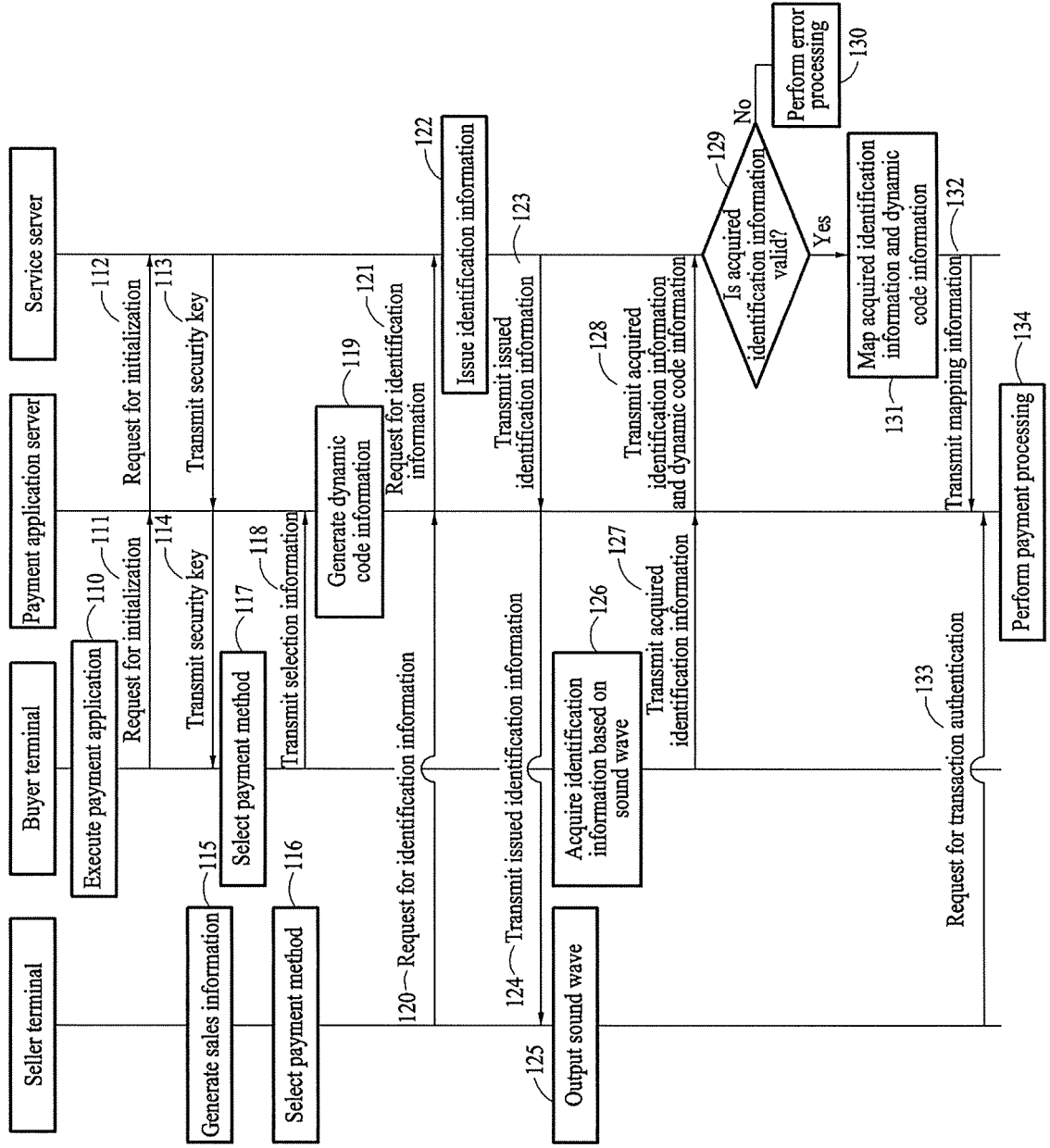
FIG. 1 is a diagram illustrating an example of an operation of a payment system according to an example embodiment.

FIG. 1 is a diagram illustrating an example of an operation of a payment system according to an example embodiment.

A payment system includes a seller terminal, a buyer terminal, a payment application server, and a service server. In the example illustrated in FIG. 1, each of the payment application server and the service server may correspond to an independent entity in the payment system. In other words, in the example illustrated in FIG. 1, the payment application server and the service server may be physically distinguished. The payment application server and the service server may also be logically distinguished in a single server system.

Referring to FIG. 1, in operation 110, the buyer terminal executes a payment application. As an example, a buyer may apply a selection input to an XYZ payment application installed in the buyer terminal for payment of a transaction item, for example, goods and/or a service to be purchased or used from a merchant, and then the buyer terminal may execute the XYZ payment application based on the selection input of the buyer.

In operation 111, the buyer terminal requests the payment application server for initialization. For example, when the payment application is executed, the buyer may input log-in information, so that the buyer terminal accesses the payment application server based on the log-in information. In this example, the buyer terminal may request the payment application server for initialization.

In operation 112, the payment application server requests the service server for initialization. In other words, the payment application server may transmit an initialization request of the buyer terminal to the service server.

When the initialization request of the buyer terminal is received from the payment application server, the service server transmits a security key targeted at the buyer terminal to the payment application server in operation 113. The security key may be changed at preset intervals, for example, a day or a week. Without being limited thereto, the security key may also be changed each time that the initialization is requested from the buyer terminal. The security key targeted at the buyer terminal may be different from a security key targeted at another buyer terminal. Depending on an implementation, the security key targeted at the buyer terminal may be the same as a security key targeted at another buyer terminal. The security key will be further described later.

In operation 114, the payment application server transmits the security key to the buyer terminal. Through this, the payment application server and the buyer terminal may share the security key.

In operation 115, the seller terminal generates sales information. The seller terminal may generate sales information of the transaction item of the buyer. The sales information may include, for example a price of the transaction item and a number of transaction items. The seller terminal may scan a barcode of an item to be purchased by the buyer and generate sales information of the item based on the scanning. The seller terminal may be operated by a person or unmanned depending on an implementation.

In operation 116, the seller terminal selects a payment method. The seller terminal may select a credit card payment, a point payment, or a payment associated with the XYZ payment application being executed in the buyer terminal as the payment method.

In operation 117, the buyer terminal selects a payment method. For example, information on an xyz card may be registered on the XYZ payment application. In this example, the buyer terminal may select the xyz card as the payment method based on a selection of the buyer. In the example illustrated in FIG. 1, the xyz card may be selected by the buyer terminal as the payment method.

In operation 118, the buyer terminal transmits selection information generated based on the selecting of the payment method to the payment application server. In other words, the buyer terminal may inform the payment application server of a selected payment method. For example, the buyer terminal may transmit selection information indicating that the xyz card is selected, to the payment application server.

In operation 119, the payment application server receives one-time information generated by a card company server and generates dynamic code information corresponding to the one-time information. The dynamic code information may be unique to a current transaction. Also, the dynamic code information may be generated by the payment application server for the buyer terminal or a transaction of the buyer terminal. A process through which the payment application server receives the one-time information will be described with reference to FIG. 8. In the example illustrated in FIG. 1, dynamic code information "ABC" corresponding to the one-time information may be generated.

The payment application server may transmit the dynamic code information to the buyer terminal. The buyer terminal may display the dynamic code information on a display. As an example, the buyer terminal may display the dynamic code information "ABC" in a numeric sequence, for example, 5044 3214 5632 5798 10000, and/or a visual code, for example, a barcode and a quick response (QR) code. Depending on an implementation, the payment application server may not transmit the dynamic code information to the buyer terminal or may transmit the one-time information to the buyer terminal.

In operation 120, the seller terminal requests the payment application server for identification information. In other words, when the payment method is selected, the seller terminal may transmit an identification information issue request to the payment application server.

In operation 121, the payment application server requests the service server for identification information. In other words, the payment application server may transmit an identification information issue request of the seller terminal to the service server.

In operation 122, the service server issues identification information for the seller terminal. In the example illustrated in FIG. 1, the service server may issue identification information "12345" for the seller terminal. Depending on an implementation, the service server may generate a sequence including the issued identification information and shuffle the sequence using a security key targeted at the buyer terminal. Related description will be made with reference to FIG. 4.

The service server may issue different identification information for the seller terminal each time that the identification information issue is requested from the seller terminal. In other words, identification information issued for the seller terminal in a current payment may be different from identification information issued to the seller terminal in another payment. For example, when the service server receives an identification information issue request of the seller terminal from the payment application server in another payment, the service server may issue identification information different from the identification information "12345" to the seller terminal. In other words, for each payment, different identification information may be issued for the seller terminal. Through this, even if the identification information issued for the seller terminal in the current payment is leaked, the issued identification information may be invalid or unavailable in another payment, so a payment security may be improved.

The service server may record the identification information "12345" issued for the seller terminal in a list. Here, in the list, identification information "67890" issued for another seller terminal may also be recorded.

In operation 123, the service server transmits the issued identification information to the payment application server.

In operation 124, the payment application server transmits the issued identification information to the seller terminal.

In operation 125, the seller terminal outputs a sound wave based on the issued identification information. The sound wave may be in an inaudible band. Without being limited thereto, the sound wave may be in an audible band. A sound wave output method of the seller terminal will be described with reference to FIG. 5.

In operation 126, the buyer terminal acquires identification information based on the sound wave. In other words, the buyer terminal may estimate the identification information issued for the seller terminal based on the sound wave. A method in which the buyer terminal acquires the identification information will be described with reference to FIG. 6. In the example illustrated in FIG. 1, the buyer terminal may acquire the identification information "12345" based on the sound wave.

In operation 127, the buyer terminal transmits the acquired identification information to the payment application server. In operation 127, the buyer terminal may request the payment application server to verify a validity of the acquired identification information. In other words, the buyer terminal may inquire at the payment application server whether the acquired identification information is valid.

In operation 128, the payment application server transmits the acquired identification information and the dynamic code information to the service server. That is, the service server may receive the identification information acquired by the buyer terminal, from the payment application server. In operation 128, the payment application server requests the service server to verify a validity of the acquired identification information.

In operation 129, the service server determines whether the acquired identification information is valid. In other words, the service server may verify a validity of the received identification information. When the identification information "12345" is received from the payment application server, the service server may determine whether the identification information "12345" is valid based on at least one of an elapsed time and a check of whether the received identification information "12345" is in the list. Related description will be made with reference to FIG. 7.

In operation 130, when the acquired identification information is invalid, the service server performs an error processing.

In operation 131, when the acquired identification information is valid, the service server maps the acquired identification information and the dynamic code information. In other words, when the received identification information is valid, the service server may generate mapping information by mapping the received identification information and the dynamic code information. For example, when the received identification information "12345" is valid, the service server may map the received identification information "12345" and the dynamic code information "ABC" with respect to the seller terminal. Since the identification information "12345" is issued for the seller terminal in the current payment and the dynamic code information "ABC" is issued for the buyer terminal in the current payment, the seller terminal may be in a one-to-one correspondence with the buyer terminal on the service server through the mapping. Likewise, the service server may match another seller terminal and another buyer terminal one-to-one. For example, the service server may issue identification information "67890" for a seller terminal B. The service server may receive the identification information "67890" acquired by a buyer terminal B from the payment application server, verify whether the received identification information "67890" is valid, and map the identification information "67890" and dynamic code information "DEF" of the buyer terminal B with respect to the seller terminal B.

In operation 132, the service server transmits the mapping information generated based on the mapping of the acquired identification information and the dynamic code information to the payment application server. The mapping information may include, for example, the identification information "12345" and the dynamic code information "ABC". Also, the mapping information may include information indicating a seller terminal to which the identification information "12345" and the dynamic code information "ABC" are mapped. In other words, the mapping information may include information indicating that the identification information "12345" and the dynamic code information "ABC" are mapped with respect to the seller terminal for which the identification information "12345" is issued and/or information associated with the seller terminal for which the identification information "12345" is issued, for example, seller information or merchant information. Likewise, mapping information B may be generated by mapping the identification information "67890" and the dynamic code information "DEF" on the service server. The mapping information B may include information indicating that the identification information "67890" and the dynamic code information "DEF" are mapped with respect to a seller terminal for which the identification information "67890" is issued, that is, the seller terminal B and/or information associated with the seller terminal for which the identification information "67890" is issued, for example, seller information or merchant information.

In operation 133, the seller terminal requests the payment application server for transaction authentication. For example. the seller terminal may output the sound wave, and then transmit a transaction authentication request to the payment application server. Depending on an implementation, the seller terminal may output the sound wave and transmit the transaction authentication request to the payment application server simultaneously.

In operation 133, the seller terminal may transmit merchant information and/or transaction amount information to the payment application server together with the transaction authentication request. The merchant information may include, for example, information associated with a merchant to which the seller terminal belongs and/or the identification information issued for the seller terminal. Depending on an implementation, the merchant information may not include the identification information issued for the seller terminal.

In operation 134, when the transaction authentication request of the seller terminal is received, the payment application server may perform a payment processing by referencing or considering the mapping information.

In one example, when the transaction authentication request, the merchant information, and the transaction amount information are received from the seller terminal, the payment application server may generate a payment request based on one-time information corresponding to the dynamic code information in the mapping information, the merchant information, and the transaction amount information. For example, the payment application server may search for mapping information including identification information matching the identification information "12345" issued for the seller terminal. In this example, mapping information in which "12345" and "ABC" are mapped may be found. When the mapping information is found, the payment application server may generate a payment request. For example, the payment application server may generate the payment request based on one-time information corresponding to "ABC" in the found mapping information, merchant information, and payment amount information. The payment application server may transmit the payment request to a value added network (VAN) company server. The VNA company server may transmit the payment request to a card company server. The card company server may process the payment request and transmit a processing result to the VAN company server. The VAN company server may transmit the processing result to the payment application server. The payment application server may transmit the processing result to the seller terminal as a response to the transaction authentication request. Through this, the payment may be completed.

In another example, the service server may not transmit the mapping information to the payment application server. In this example, when the transaction authentication request of the seller terminal, the merchant information, and the transaction amount information are received from the seller terminal, the payment application server may transmit a query about a mapping counterpart of the identification information issued for the seller terminal to the service server. In the example illustrated in FIG. 1, since the identification information issued for the seller terminal is "12345," the payment application server may inquire the service server about a dynamic code to which the identification information "12345" issued for the seller terminal is mapped. Since "12345" and "ABC" are mapped, the service server may transmit "ABC" to the payment application server as a response to the query. When the dynamic code information is received from the service server, the payment application server may transmit a payment request generated based on one-time information corresponding to the received dynamic code information, the merchant information, and the transaction amount information, to the card company server through the VAN company server. The card company server may process the payment request and transmit a processing result to the VAN company server. The VAN company server may transmit the processing result to the payment application server. The payment application server may transmit the processing result to the seller terminal as a response to the transaction authentication request.

According to the example described with reference to FIG. 1, the buyer terminal may receive the sound wave of the seller terminal so that the payment processing is performed. The buyer may not present a credit card for payment, which may improve a payment convenience.

Figure 2A:
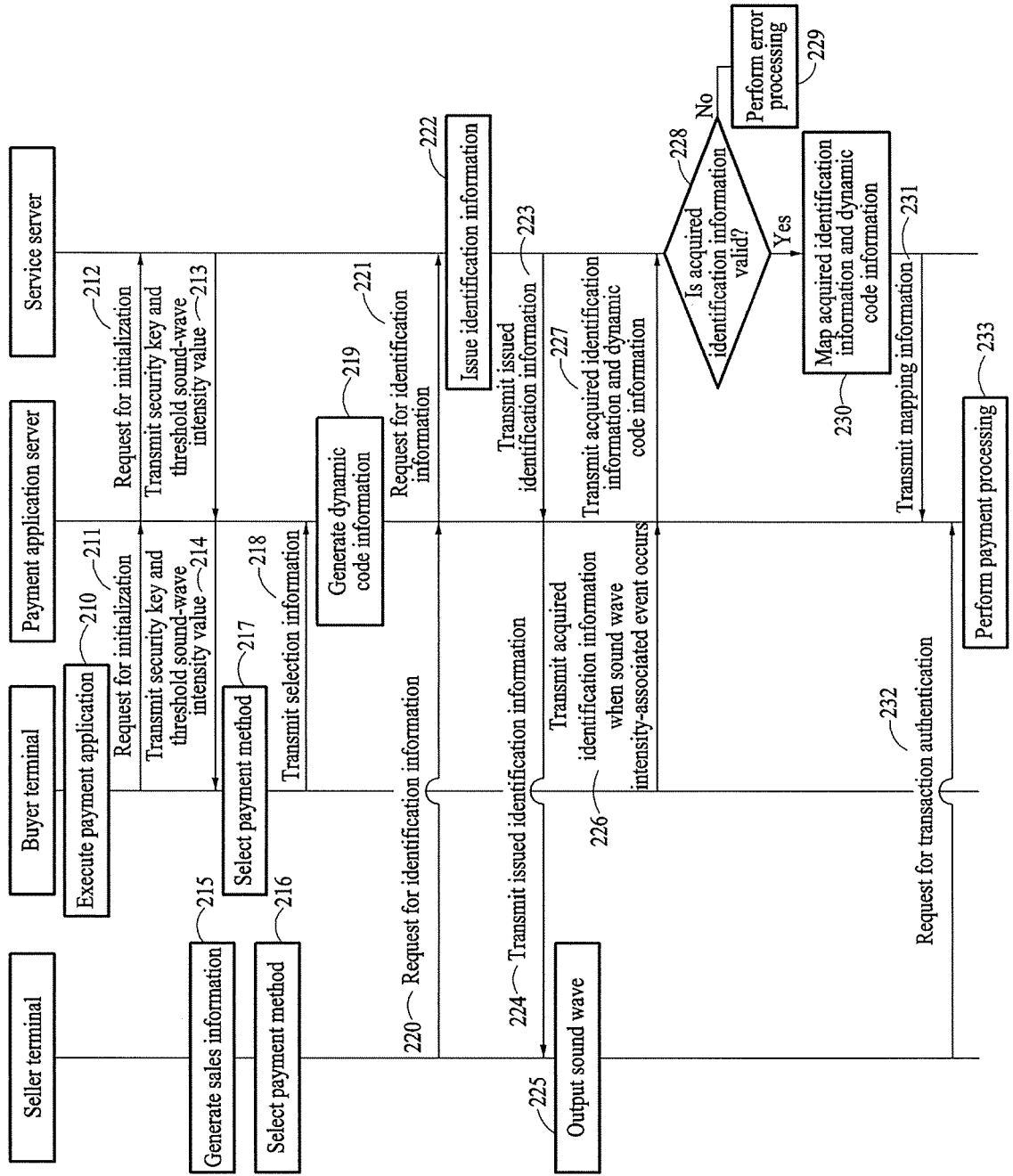
FIGS. 2A through 2C are diagrams illustrating another example of an operation of a payment system according to an example embodiment.
Figure 2B:
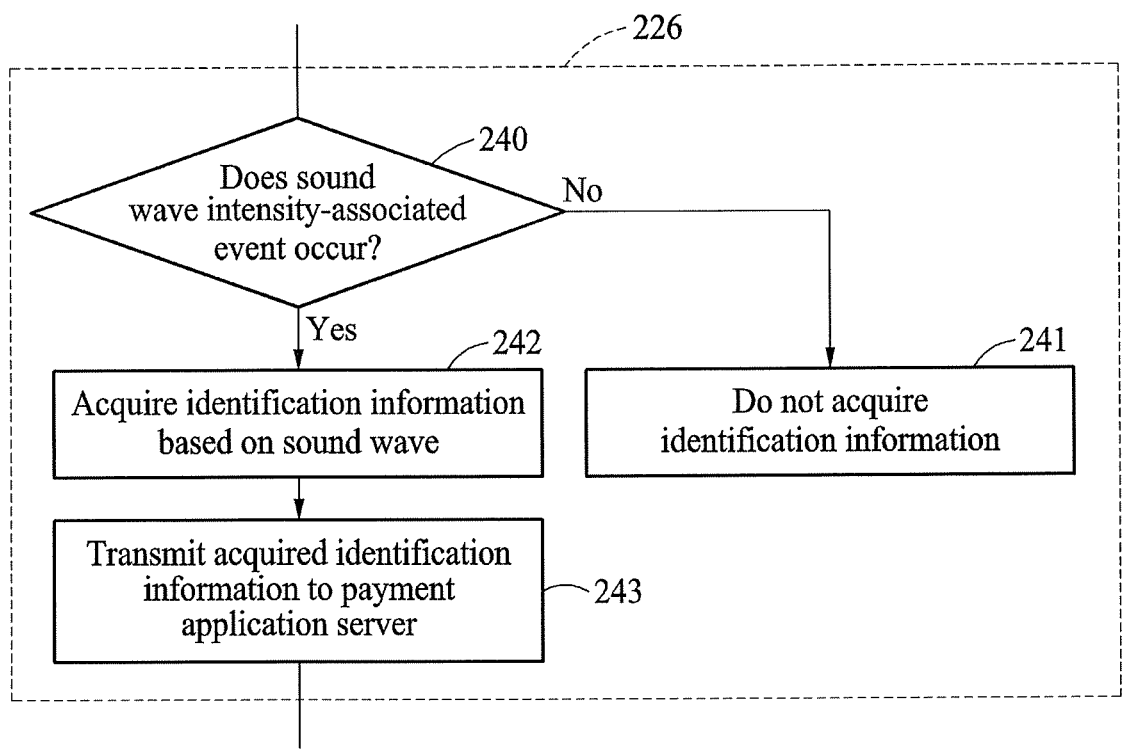
Figure 2C:
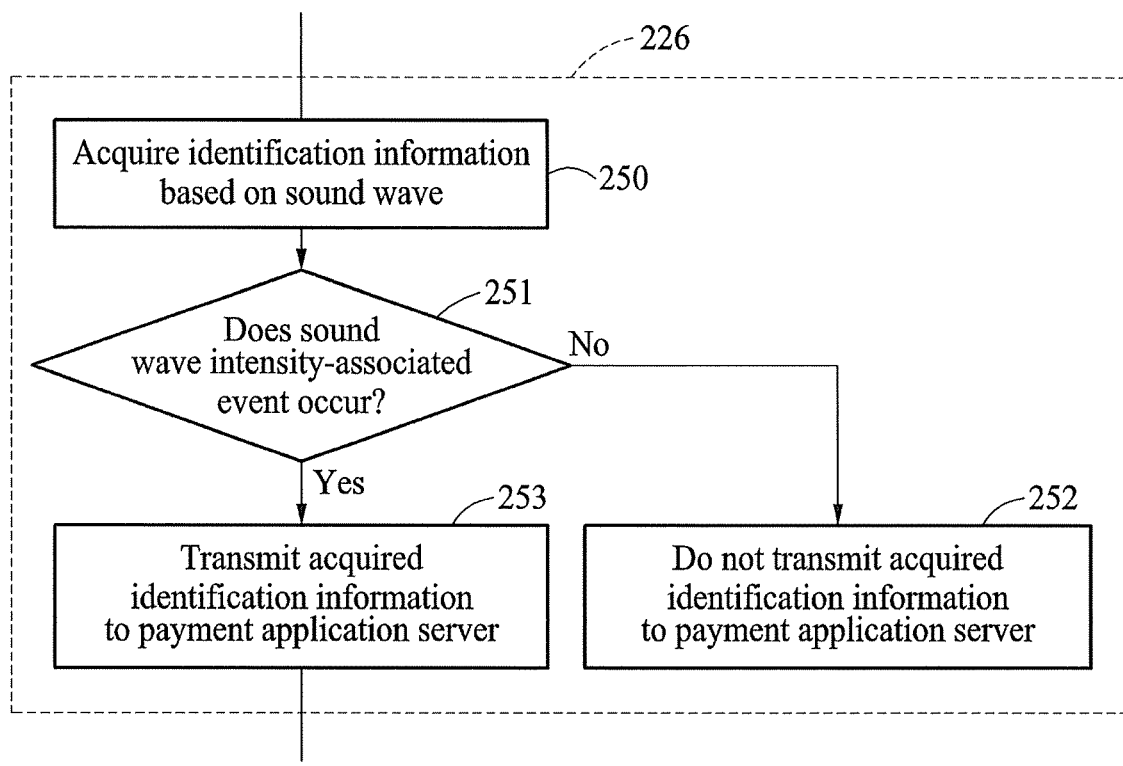

FIGS. 2A through 2C are diagrams illustrating another example of an operation of a payment system according to an example embodiment.

A payment system may consider a sound wave intensity-associated event. Related description will be made with reference to FIG. 2A.

Referring to FIG. 2A, a buyer terminal of a buyer A executes a payment application in operation 210 and requests a payment application server for initialization in operation 211.

In operation 212, the payment application server requests a service server for initialization.

When an initialization request of the buyer terminal is received from the payment application server, the service server transmits a threshold sound-wave intensity value and a security key targeted at the buyer terminal to the payment application server in operation 213. Unlike the example illustrated in FIG. 1, the service server may transmit the threshold sound-wave intensity value targeted at the buyer terminal to the payment application server in addition to the security key. Here, the threshold sound-wave intensity value may be calculated by the service server and/or the payment application server based on a type of the buyer terminal.

In operation 214, the payment application server transmits the security key and the threshold sound-wave intensity value to the buyer terminal.

A seller terminal generates sales information in operation 215 and selects a payment method in operation 216.

The buyer terminal selects a payment method in operation 217 and transmits selection information to the payment application server in operation 218.

In operation 219, the payment application server generates dynamic code information.

In operation 220, the seller terminal requests the payment application server for identification information.

In operation 221, the payment application server requests the service server for identification information.

The service server issues identification information for the seller terminal in operation 222 and transmits the issued identification information to the payment application server in operation 223.

In operation 224, the payment application server transmits the issued identification information to the seller terminal.

In operation 225, the seller terminal outputs a sound wave based on the issued identification information.

The buyer terminal of the buyer A associated with a current transaction may receive the sound wave. When a merchant has a buyer terminal of a buyer B (hereinafter, also be referred to as "another buyer terminal"), the other buyer terminal which is not associated with the transaction of the buyer A may also receive the output sound wave. In this case, in addition to the buyer terminal, the other buyer terminal may also acquire identification information based on the sound wave and transmit the acquired identification information to the payment application server. Since the buyer terminal and the other buyer terminal receive the same sound wave, the identification information acquired by the buyer terminal may be the same as the identification information acquired by the other buyer terminal. Thus, when the payment application server receives the identification information acquired by each of the buyer terminal and the other buyer terminal, the payment application server may be difficult to identify a terminal associated with the current transaction between the buyer terminal and the other buyer terminal.

The buyer terminal may be located close to the seller terminal or a sound wave output interface, for example, a speaker of the seller terminal, and the other buyer terminal may be located away from the seller terminal. A sound wave intensity value measured by the buyer terminal may be greater than a sound wave intensity value measured by the other buyer terminal. Thus, the payment system may consider a sound wave intensity-associated event.

When a sound wave intensity-associated event occurs, the buyer terminal transmits the identification information acquired based on the sound wave to the payment application server in operation 226. The sound wave intensity-associated event may occur when the sound wave intensity value measured by the buyer terminal is greater than or equal to the threshold sound-wave intensity value. Unlike the example illustrated in FIG. 1, an occurrence of the sound wave intensity-associated event may correspond to a condition for transmitting the identification information acquired by the buyer terminal. Operation 226 will be further described with reference to FIGS. 2B and 2C.

Since the sound wave intensity-associated event does not occur in the other buyer terminal, the other buyer terminal may not transmit the identification information acquired based on the sound wave to the payment application server or may not acquire the identification information.

In operation 227, the payment application server transmits the acquired identification information and the dynamic code information to the service server.

In operation 228, the service server determines whether the acquired identification information is valid. Related description will be made with reference to FIG. 7.

In operation 229, when the identification information acquired by the buyer terminal is invalid, the service server performs an error processing.

When the identification information acquired by the buyer terminal is valid, the service server maps the acquired identification information and the dynamic code information in operation 230. In operation 231, the service server transmits mapping information to the payment application server.

In operation 232, the seller terminal requests the payment application server for transaction authentication. The seller terminal may transmit merchant information and/or transaction amount information to a server together with a transaction authentication request.

When a transaction authentication request is received from the seller terminal, the payment application server performs a payment processing based on the mapping information in operation 233.

Since the description of FIG. 1 may also be applicable to FIG. 2A, repeated description will be omitted. Hereinafter, an example of operation 226 will be described with reference to FIG. 2B and another example of operation 226 will be described with reference to FIG. 2C.

Referring to FIG. 2B, in operation 240, the buyer terminal verifies whether a sound wave intensity-associated event occurs. For example, the buyer terminal may measure a sound wave intensity and determine whether a value of the measured sound wave intensity is greater than or equal to a threshold sound-wave intensity value.

When the sound wave intensity-associated event does not occur, the buyer terminal may not acquire identification information in operation 241.

When the sound wave intensity-associated event occurs, the buyer terminal acquires identification information based on the sound wave in operation 242 and transmits the acquired identification information to the payment application server in operation 243. A method in which the buyer terminal acquires the identification information will be described with reference to FIG. 6.

Referring to FIG. 2C, in operation 250, the buyer terminal acquires identification information based on the sound wave.

In operation 251, the buyer terminal verifies whether a sound wave intensity-associated event occurs.

When the sound wave intensity-associated event does not occur, the buyer terminal may not transmit the acquired identification information to the payment application server in operation 252.

When the sound wave intensity-associated event occurs, the buyer terminal transmits the acquired identification information to the payment application server in operation 253.

Figure 3A:
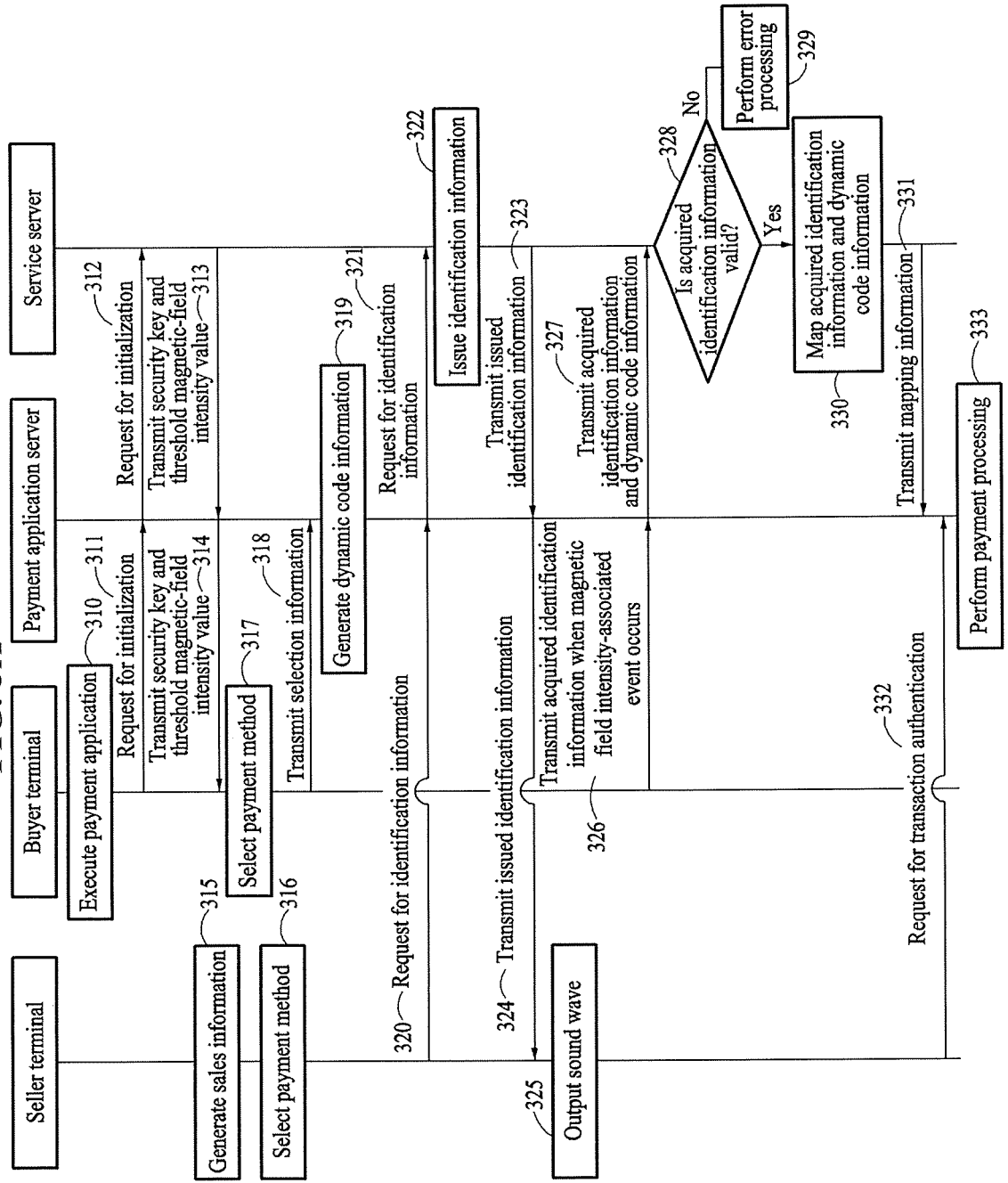
FIGS. 3A through 3C are diagrams illustrating another example of an operation of a payment system according to an example embodiment.
Figure 3B:
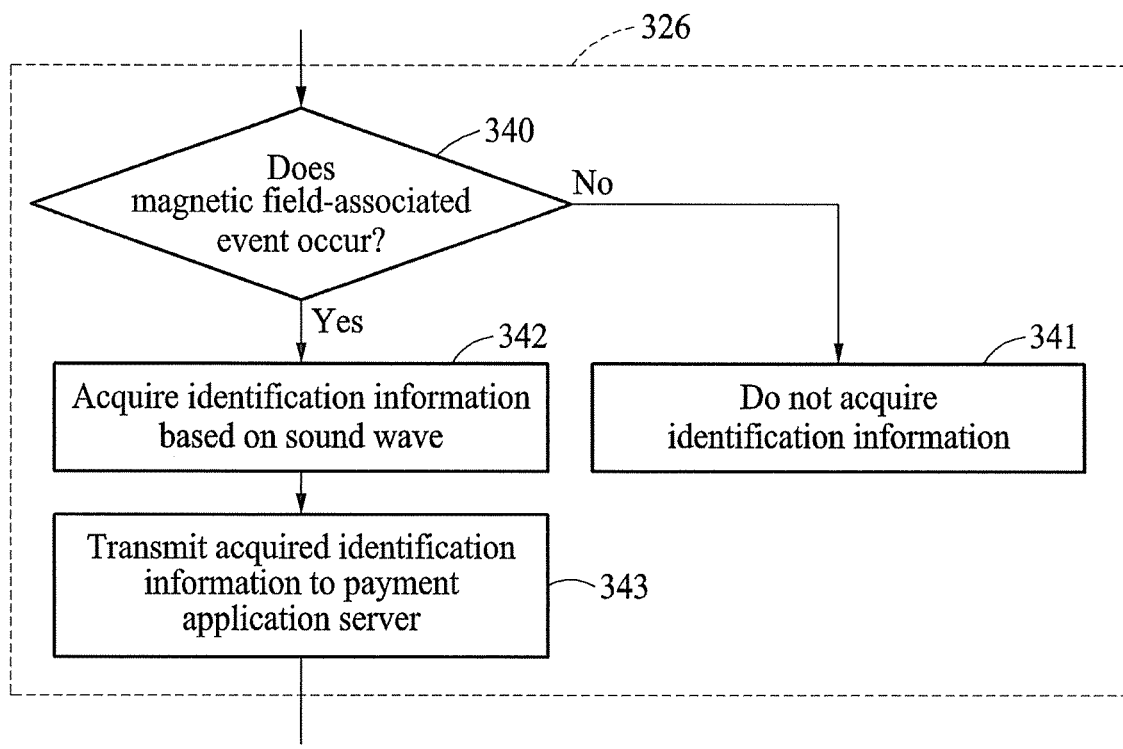
Figure 3C:
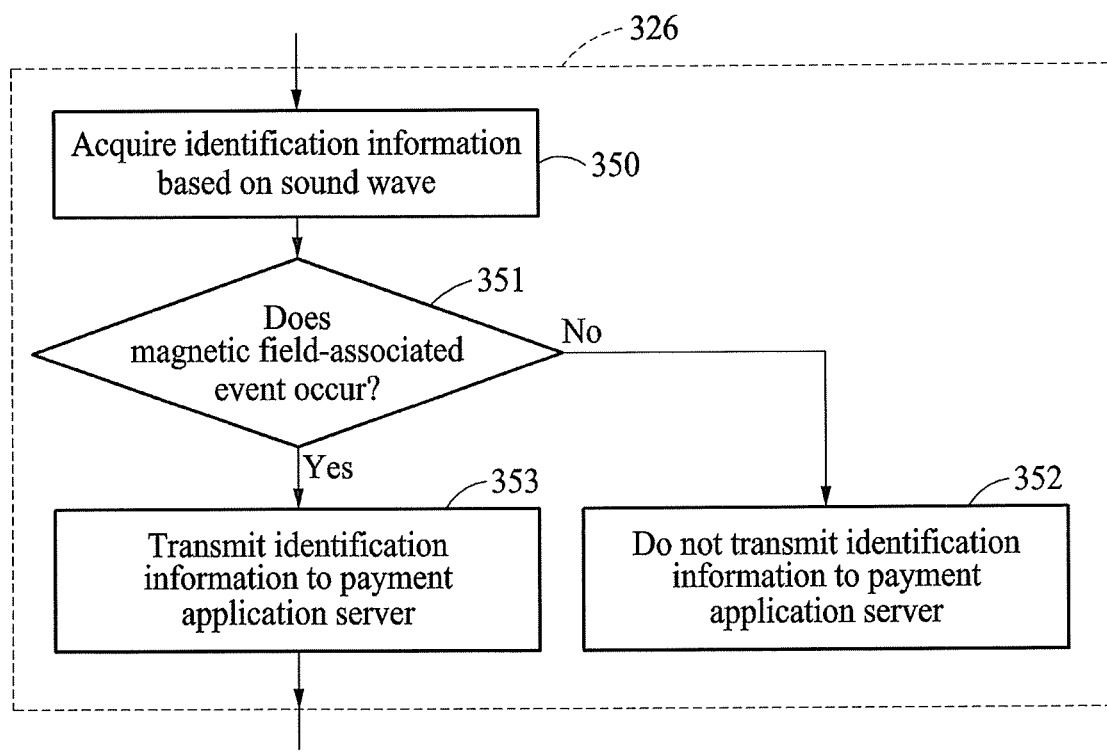

FIGS. 3A through 3C are diagrams illustrating another example of an operation of a payment system according to an example embodiment.

A payment system may consider a magnetic field intensity-associated event or a magnetic field-associated event. Related description will be mand with reference to FIG. 3A.

Referring to FIG. 3A, a buyer terminal of a buyer A executes a payment application in operation 310 and requests a payment application server for initialization in operation 311.

In operation 312, the payment application server requests a service server for initialization.

When an initialization request of the buyer terminal is received from the payment application server, the service server transmits a security key targeted at the buyer terminal and at least one of a threshold magnetic-field intensity value and a threshold change amount to the payment application server in operation 313. Unlike the examples illustrated in FIGS. 1 and 2A, the service server may transmit at least one of the threshold magnetic-field intensity value and the threshold change amount to the payment application server. Here, the threshold magnetic-field intensity value and the threshold change amount may be calculated by the service server and/or the payment application server based on a type of the buyer terminal.

In operation 314, the payment application server transmits the security key and the threshold magnetic-field intensity value to the buyer terminal.

A seller terminal generates sales information in operation 315 and selects a payment method in operation 316.

The buyer terminal selects a payment method in operation 317 and transmits selection information to the payment application server in operation 318.

In operation 319, the payment application server generates dynamic code information.

In operation 320, the seller terminal requests the payment application server for identification information.

In operation 321, the payment application server requests the service server for identification information.

The service server issues identification information for the seller terminal in operation 322 and transmits the issued identification information to the payment application server in operation 323.

In operation 324, the payment application server transmits the issued identification information to the seller terminal.

In operation 325, the seller terminal outputs a sound wave based on the issued identification information.

As described with reference to FIG. 2, the buyer terminal of the buyer A associated with a current transaction and a buyer terminal of a buyer B (hereinafter, also be referred to as "another buyer terminal"), which is not associated with the current transaction may receive the sound wave. In this case, when the identification information acquired by each of the buyer terminal and the other buyer terminal is transmitted to the payment application server, the payment application server may be difficult to identify a terminal associated with the current transaction performed between the buyer terminal and the other buyer terminal.

The buyer terminal may be located close to the seller terminal or a sound wave output interface, for example, a speaker of the seller terminal, and the other buyer terminal may be located away from the seller terminal. In this instance, when a magnetic field is formed in the seller terminal, an intensity of the magnetic field may be differently measured for each of the buyer terminal and the other buyer terminal. Since the buyer terminal is located close to the seller terminal, a high intensity of magnetic field may be sensed by the buyer terminal. In contrast, since the other buyer terminal is located away from the seller terminal, the other buyer terminal may sense a low intensity of magnetic field or may not sense a magnetic field. Thus, the payment system may consider a magnetic field intensity-associated event.

When a magnetic field intensity-associated event occurs, the buyer terminal transmits the identification information acquired based on the sound wave to the payment application server in operation 326. The magnetic field intensity-associated event may occur when the buyer terminal is located close to the seller terminal. For example, when the buyer terminal is located close to the seller terminal, a magnetic field intensity value measured by the buyer terminal may be greater than or equal to the threshold magnetic-field intensity value, or a change amount of the magnetic-field intensity value may be greater than or equal to a threshold change amount. Operation 326 will be further described with reference to FIGS. 3B and 3C.

Since the magnetic field intensity-associated event does not occur in the other buyer terminal, the other buyer terminal may not acquire the identification information even when the sound wave is received. Also, since the magnetic field intensity-associated event does not occur even if the identification information acquired based on the sound wave is acquired, the other buyer terminal may not transmit the acquired identification information to the payment application server.

In operation 327, the payment application server transmits the acquired identification information and the dynamic code information to the service server.

In operation 328, the service server determines whether the acquired identification information is valid.

In operation 329, when the acquired identification information is invalid, the service server performs an error processing.

When the acquired identification information is valid, the service server maps the acquired identification information and the dynamic code information in operation 330. In operation 331, the service server transmits mapping information to the payment application server.

In operation 332, the seller terminal requests the payment application server for transaction authentication.

When a transaction authentication request is received from the seller terminal, the payment application server performs a payment processing based on the mapping information in operation 333.

Since the description of FIG. 1 may also be applicable to FIG. 3A, repeated description will be omitted. Hereinafter, an example of operation 326 will be described with reference to FIG. 3B and another example of operation 326 will be described with reference to FIG. 3C.

Referring to FIG. 3B, in operation 340, the buyer terminal verifies whether a magnetic field intensity-associated event or a magnetic field-associated event occurs. For example, a magnetic field intensity value may be generated when a terrestrial magnetism sensor of the buyer terminal senses a magnetic field of the seller terminal. In addition, when the buyer terminal is located close to the seller terminal, the magnetic field intensity value may be greater than or equal to a threshold magnetic-field intensity value. Also, when the buyer terminal is located close to the seller terminal, the magnetic field intensity value may significantly increase and a change amount of the magnetic field intensity value may be greater than or equal to a threshold change mount. When the magnetic field intensity value is greater than or equal to the threshold magnetic-field intensity value and/or when the change amount of the magnetic field intensity value is greater than or equal to the threshold change mount, the magnetic field intensity-associated event may occur.

The magnetic field may be generated by a magnetic substance of the seller terminal. For example, the magnetic field may be generated by a magnet included in the speaker of the seller terminal or a magnet attached to the seller terminal.

When the magnetic field intensity-associated event does not occur, the buyer terminal may not acquire identification information in operation 341.

When the magnetic field intensity-associated event occurs, the buyer terminal acquires identification information based on the sound wave in operation 342 and transmits the acquired identification information to the payment application server in operation 343.

Depending on an implementation, when the magnetic field intensity-associated event occurs, the buyer terminal may receive the sound wave by activating a microphone and acquires identification information based on the sound wave. When the magnetic field intensity-associated event does not occur, the buyer terminal may not activate the microphone. In this case, the buyer terminal may not receive a sound wave.

Referring to FIG. 3C, in operation 350, the buyer terminal acquires identification information based on the sound wave.

In operation 351, the buyer terminal verifies whether a magnetic field intensity-associated event or a magnetic field-associated event occurs.

When the magnetic field intensity-associated event does not occur, the buyer terminal may not transmit the acquired identification information to the payment application server in operation 352.

When the sound wave intensity-associated event occurs, the buyer terminal transmits the acquired identification information to the payment application server in operation 353.

In an example, the payment system may consider both the sound wave intensity-associated event and the magnetic field intensity-associated event. In this example, the service server may transmit the security key, the threshold sound-wave intensity value, and the threshold magnetic-field intensity value to the buyer terminal through the payment application server as a response to the initialization request. Also, when the sound wave intensity-associated event and the magnetic field intensity-associated event occur, the buyer terminal may transmit the identification information acquired based on the sound wave to the payment application server.

Figure 4:
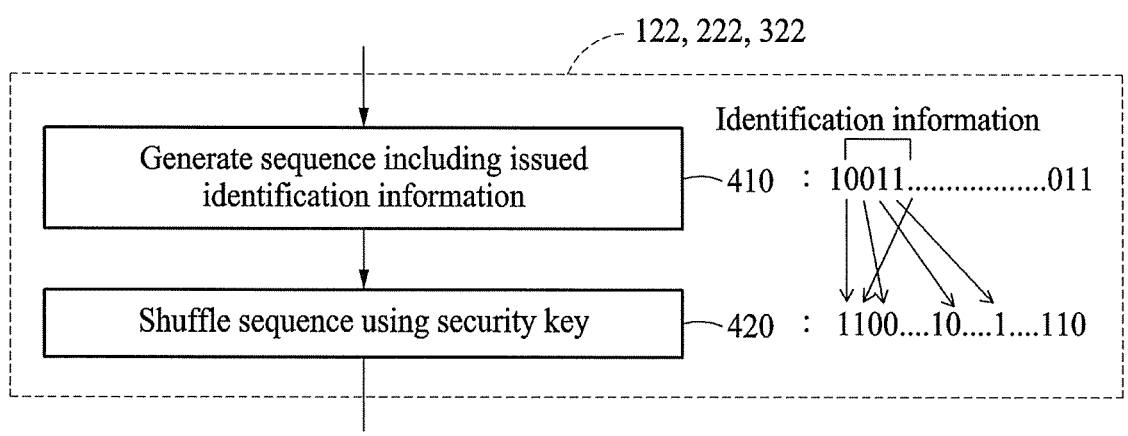
FIG. 4 is a diagram illustrating a sequence determination method of a service server according to an example embodiment.

FIG. 4 is a diagram illustrating a sequence determination method of a service server according to an example embodiment.

As described with reference to FIGS. 1, 2A, and 3A, a service server issues identification information for a seller terminal in operations 122, 222, and 322. In an example illustrated in FIG. 4, the issued identification information may be "10011". The service server may transmit the issued identification information to the seller terminal through a payment application server. The service server may enhance a security of the issued identification information. Hereinafter, related description will be made with reference to FIG. 4.

Referring to FIG. 4, in operation 410, the service server generates a sequence including issued identification information. As illustrated in FIG. 4, the service server may generate a sequence including the issued identification information "10011". The service server may generate a sequence including error correction bits or error correction codes, and the issued identification information. For example, the service server may add the error correction bits to "10011". In the example illustrated in FIG. 4, the service server may generate a sequence "10011 . . . 011" including the error correction bits and the issued identification information.

In operation 520, the service server may shuffle the sequence using a security key. In other words, the service server may rearrange bits of the sequence using a security key targeted at a buyer terminal. In the example illustrated in FIG. 4, "1100 . . . 10 . . . 1 . . . 110" may be generated by shuffling "10011 . . . 011".

The service server may transmit the shuffled sequence to the payment application server. The payment application server may transmit the shuffled sequence to the seller terminal.

The example described with reference to FIG. 4 is merely an example of an implementation. As described above, the service server may transmit the issued identification information to the seller terminal through the payment application server.

The seller terminal may output a sound wave. Hereinafter, a sound wave output method of the seller terminal will be described with reference to FIG. 5.

Figure 5:
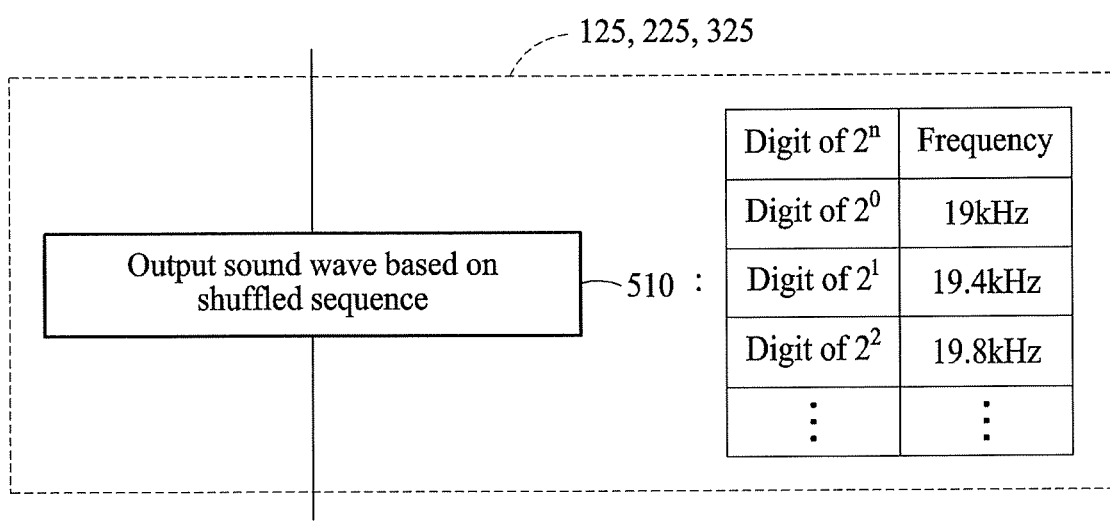
FIG. 5 is a diagram illustrating a sound wave output method of a seller terminal according to an example embodiment.

FIG. 5 is a diagram illustrating a sound wave output method of a seller terminal according to an example embodiment.

In operation 510, a seller terminal outputs a sound wave based on issued identification information. For example, the seller terminal may output or not output a sound wave corresponding to a frequency mapped to each digit of the issued identification information based on a bit value corresponding to each digit of the issued identification information. Specifically, in the issued identification information "10011" and a table illustrated in FIG. 5, a digit of $2^0$, a digit of $2^1$, and a digit of $2^4$ of the issued identification information are 1. Thus, the seller terminal may output a sound wave corresponding to 19 kilohertz (KHz), a sound wave corresponding to 19.4 kHz, and a sound wave corresponding to 20.6 kHz. Also, since a digit of $2^2$ and a digit of $2^3$ of the issued sequence are 0, the seller terminal may not output a sound wave corresponding to 19.8 KHz and a sound wave corresponding to 20.2 kHz. The seller terminal may simultaneously or sequentially output the sound wave corresponding to 19 KHz, the sound wave corresponding to 19.4 kHz, and the sound wave corresponding to 20.6 kHz.

Depending on an implementation, the seller terminal may receive a shuffled sequence from a payment application server. In this case, as described in operation 510, the seller terminal may output or not output a sound wave corresponding to a sound wave corresponding to each digit of the shuffled sequence based on a bit value corresponding to each digit of the shuffled sequence.

When the seller terminal outputs a sound wave, a buyer terminal may receive the sound wave through a microphone and acquire identification information based on the sound wave. Hereinafter, an identification information acquiring method of the buyer terminal will be described with reference to FIG. 6.

Figure 6:
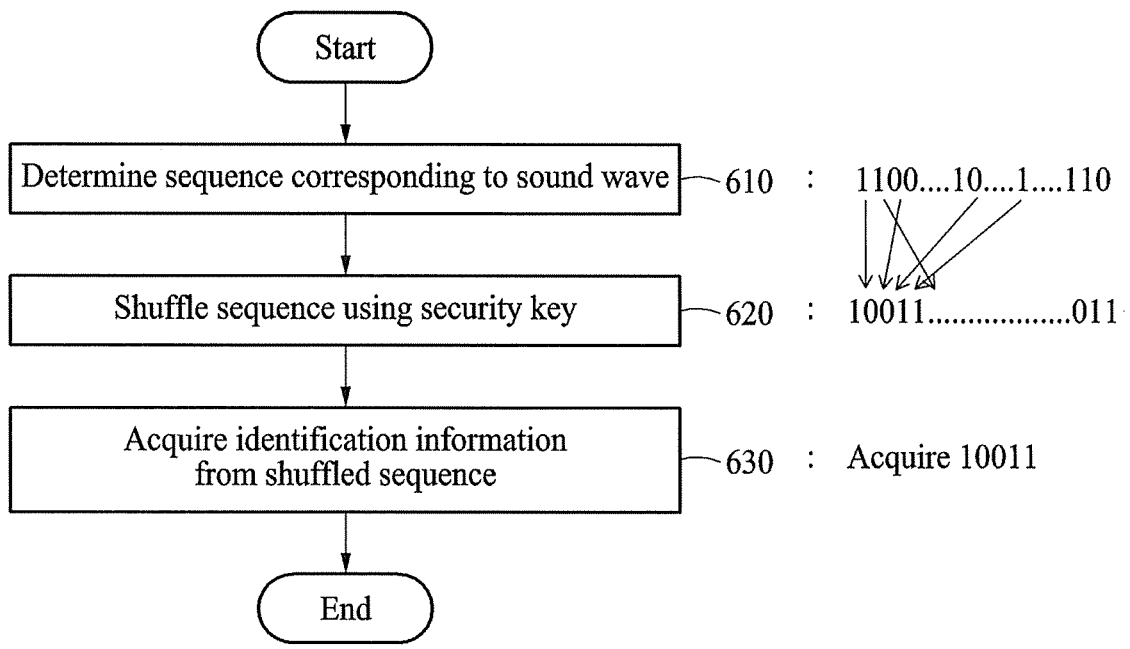
FIG. 6 is a diagram illustrating an identification information acquiring method of a buyer terminal according to an example embodiment.

FIG. 6 is a diagram illustrating an identification information acquiring method of a buyer terminal according to an example embodiment.

A seller terminal may output a sound wave based on a shuffled sequence "1100 . . . 10 . . . 1 . . . 110". The seller terminal may simultaneously output, for example, a sound wave corresponding to 19.4 KHz and a sound wave corresponding to 19.8 kHz.

Referring to FIG. 6, in operation 610, a buyer terminal determines a sequence corresponding to a sound wave. In response to a sound wave reception being completed, as illustrated in the example of FIG. 6, the buyer terminal may determine the sequence "1100 . . . 10 . . . 1 . . . 110". Specifically, since a sound wave corresponding to 19 kHz is absent, the buyer terminal may determine a digit of $2^0$ to be 0. Also, since sound waves corresponding to 19.4 KHz and 19.8 kHz are present, the buyer terminal may determine a digit of $2^1$ and a digit of $2^2$ to be 1. Likewise, the buyer terminal may determine bit values corresponding to a digit of $2^3$ to a last digit. Through this. the buyer terminal may determine the sequence "1100 . . . 10 . . . 1 . . . 110".

In operation 620, the buyer terminal shuffles the sequence using a security key. As illustrated in FIG. 6, the buyer terminal may shuffle a sequence "1100 . . . 10 . . . 1" using a security key. Through this, a shuffled sequence "10011 . . . 011" may be generated.

In operation 630, the buyer terminal acquires identification information from the shuffled sequence. The buyer terminal may be aware of a portion corresponding to the identification information in the shuffled sequence. Thus, the buyer terminal may acquire the identification information from the shuffled sequence. The buyer terminal may transmit the acquired identification information to the payment application server. As described with reference to FIGS. 1, 2A, and 3A, a payment application server may transmit dynamic code information and the acquired identification information to the service server.

When the identification information acquired by the buyer terminal is received from the payment application server, a service server may determine whether the identification information acquired by the buyer terminal is valid. Hereinafter, an identification information validity determination method of the service server will be described with reference to FIG. 7.

Figure 7:
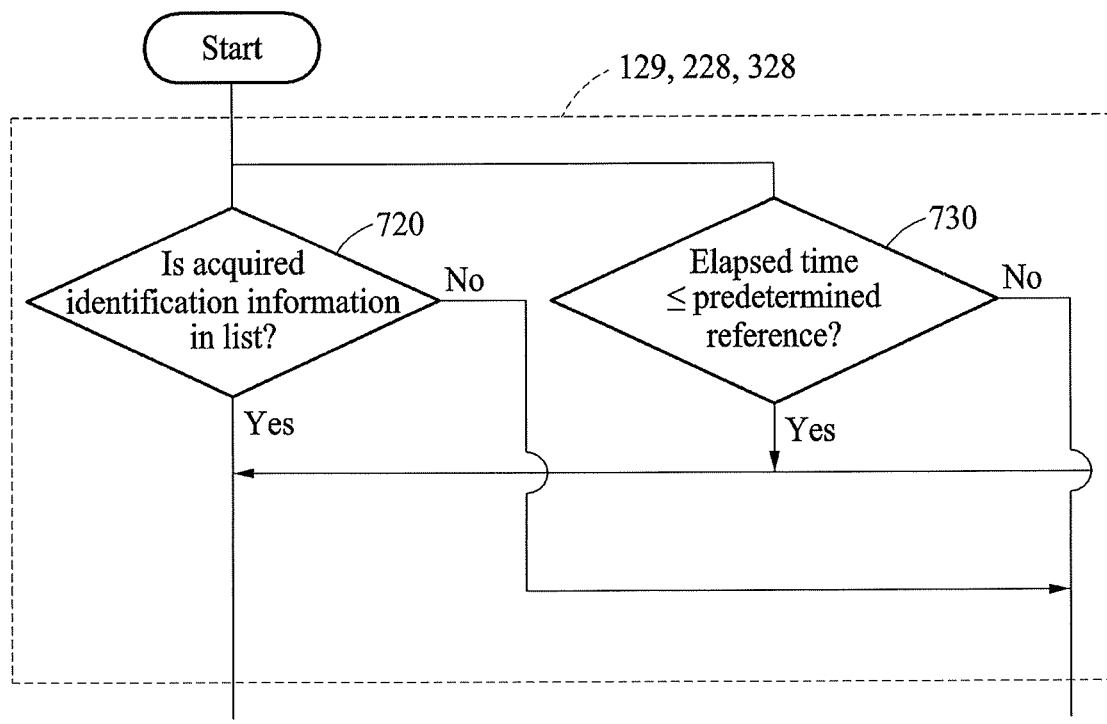
FIG. 7 is a diagram illustrating an identification information validity determination method of a service server according to an example embodiment.

FIG. 7 is a diagram illustrating an identification information validity determination method of a service server according to an example embodiment.

In an example illustrated in FIG. 7, identification information acquired by a buyer terminal may be "12345".

In operations 129, 228, and 328, a service server determines whether the information acquired by the buyer terminal is valid.

As an example, in operation 710, the service server determines whether the identification information "12345" acquired by the buyer terminal is in a list of items of identification information generated by the service server. Here, when the identification information "12345" acquired by the buyer terminal is in the list, the service server may determine that the identification information "12345" is valid. Also, when the identification information "12345" acquired by the buyer terminal is not in the list, the service server may determine that the identification information "12345" is invalid.

As another example, in operation 720, the service server determines whether an elapsed time from a point in time at which an identification information provision request is received from the payment application server to a point in time at which the identification information acquired by the buyer terminal is received is within a predetermined reference, for example, 30 seconds. When the elapsed time is within the predetermined reference, the service server may determine that the identification information "12345" acquired by the buyer terminal is valid. When the elapsed time exceeds the predetermined reference, the service server may determine that the identification information "12345" acquired by the buyer terminal is invalid.

Depending on an implementation, the service server may perform operations 710 and 710, thereby determining whether the identification information acquired by the buyer terminal is valid.

Figure 8:
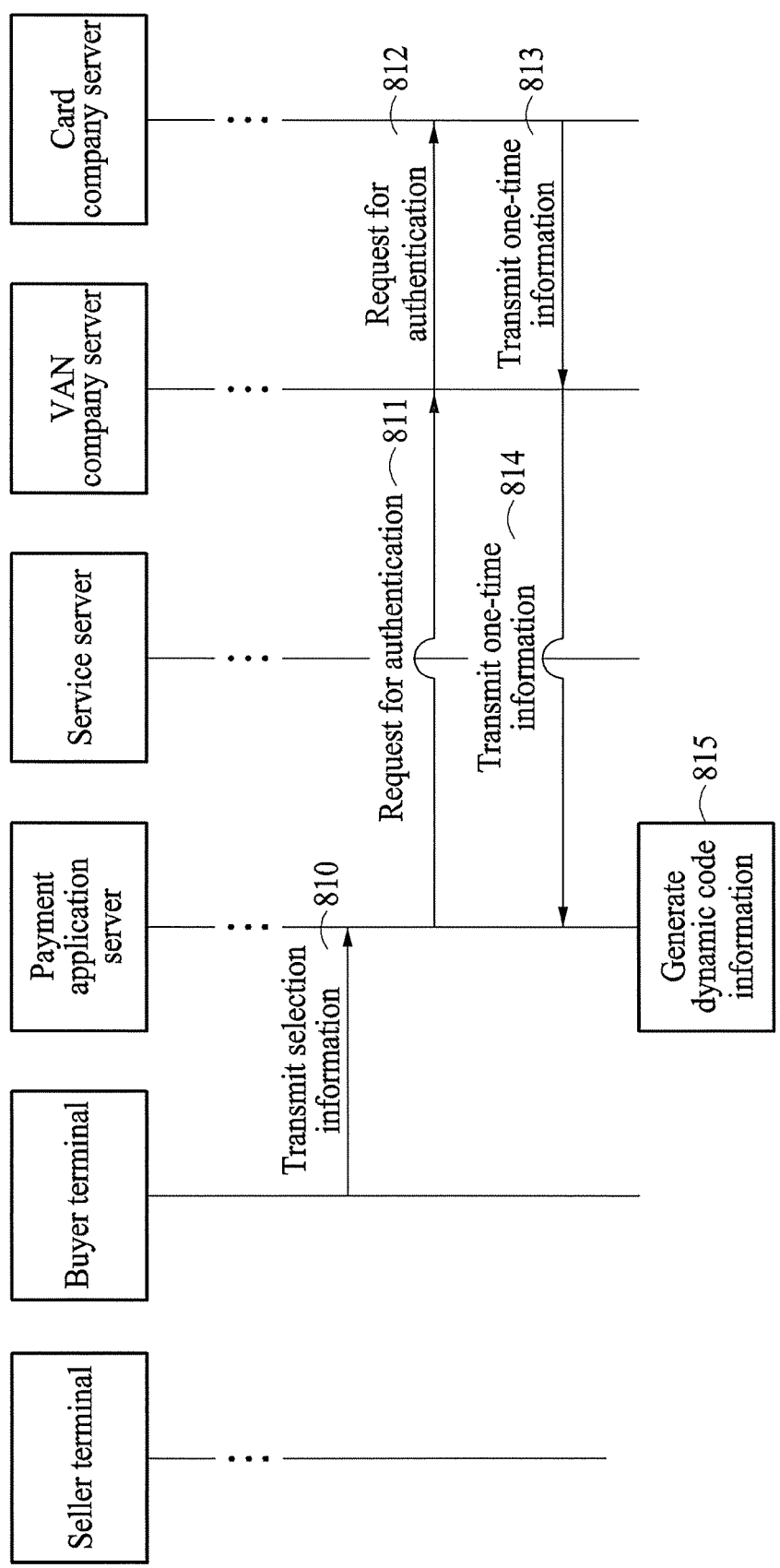
FIG. 8 is a diagram illustrating a method of receiving one-time information in a payment application server of a payment system according to an example embodiment.

FIG. 8 is a diagram illustrating a method of receiving one-time information in a payment application server of a payment system according to an example embodiment.

Referring to FIG. 8, in operation 810, a payment application server receives selection information from a buyer terminal.

When the selection information is received, the payment application server transmits a request for authentication of a payment method selected in the buyer terminal and/or a buyer authentication request to a VAN company server in operation 811. In operation 812, the VAN company server transmits the authentication requests to a card company server. For example, when an xyz card is selected, the payment application server may request an xyz card company server to perform authentication of the xyz card and/or buyer authentication through the VAN company server.

The card company server may authenticate the payment method selected by the buyer terminal and/or a buyer and generate one-time information corresponding to the payment method selected by the buyer terminal based on an authentication result. For example, when the authentication of the xyz card and/or the buyer authentication is successful, the xyz card company server may generate one-time information corresponding to the xyz card.

In operation 813, the card company server transmits the one-tune information to the VAN company server. In operation 814, the VAN company server transmits the one-time information to the payment application server.

In operation 815, the payment application server generates dynamic code information based on the one-time information.

Since the description made with reference to FIGS. 1 through 7 is also applicable to FIG. 8, repeated description will be omitted.

Figure 9:
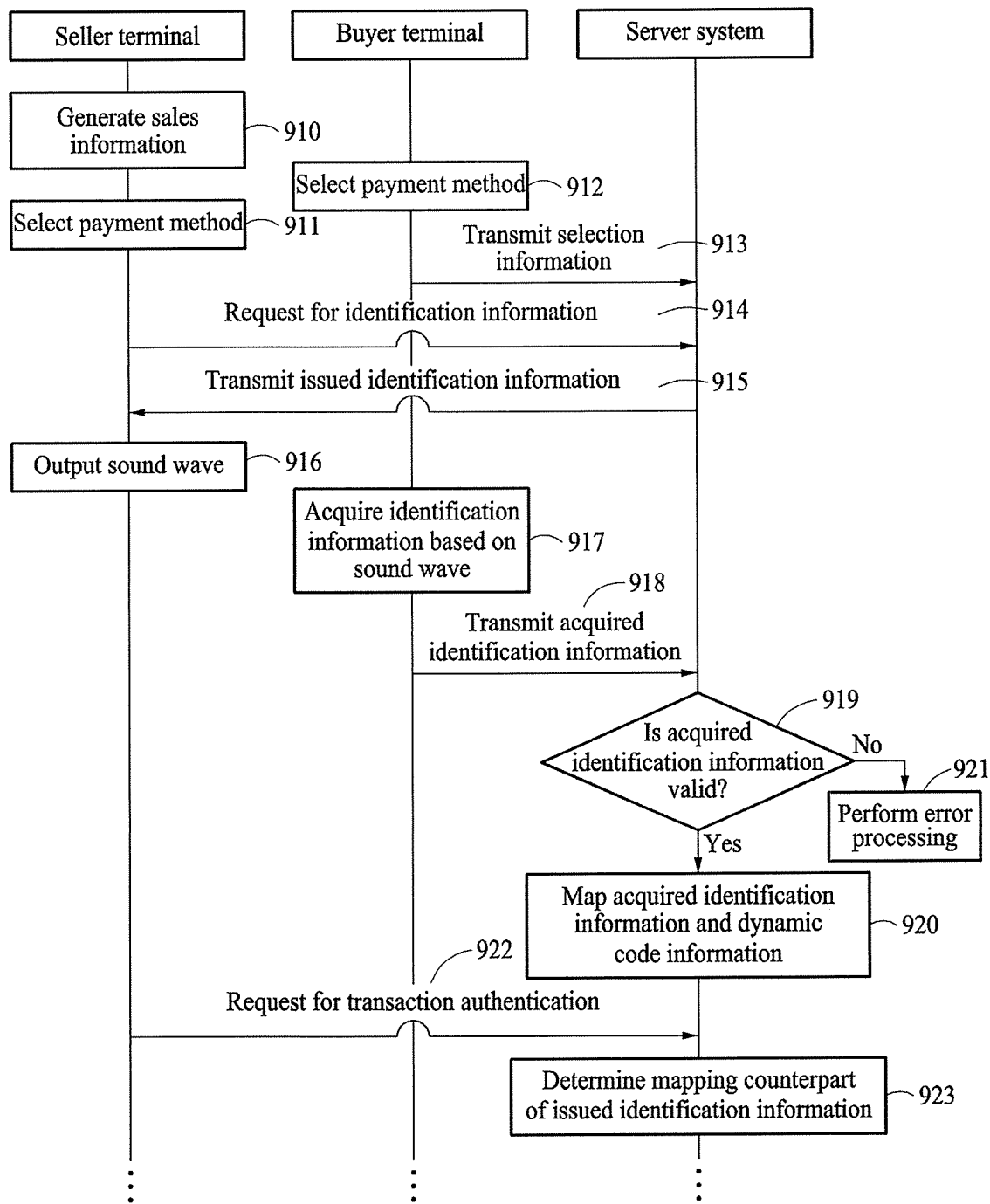
FIG. 9 is a diagram illustrating another example of an operation of a payment system according to an example embodiment.

FIG. 9 is a diagram illustrating another example of an operation of a payment system according to an example embodiment.

Referring to FIG. 9, a payment system includes a seller terminal, a buyer terminal, and a server system.

The seller terminal generates sales information in operation 910 and selects a payment method in operation 911.

The buyer terminal selects a payment method in operation 912 and requests the server system for selection information in operation 913. Since the selection information has been described with reference to FIG. 1, repeated description will be omitted.

The server system may generate dynamic code information corresponding to one-time information. The one-time information and the dynamic code information have been described with reference to FIG. 1, repeated description will be omitted. The server system may transmit the dynamic code information to the buyer terminal. In the example illustrated in FIG. 9, the dynamic code information may be "ABC". Depending on an implementation, the server system may not transmit the dynamic code information to the buyer terminal.

In operation 914, the seller terminal requests the server system for identification information. In operation 915, the server system transmits identification information to the seller terminal. In the example illustrated in FIG. 9, identification information issued for the seller terminal may be "12345". Depending on an implementation, the server system may generate a sequence including the issued identification information, shuffle the sequence using a security key, and transmit the shuffled sequence to the seller terminal. Since the description made with reference to FIG. 4 is also applicable here, repeated description will be omitted.

In operation 916, the seller terminal outputs a sound wave based on the issued identification information. Since the output of the sound wave has been described with reference to FIG. 5, repeated description will be omitted.

The buyer terminal acquires identification information based on the sound wave in operation 917 and transmits the acquired identification information to the server system in operation 918. Since the method described with reference to FIG. 6 is also applicable to operation 917, repeated description will be omitted. Depending on an implementation, when a sound wave intensity-associated event and/or a magnetic field intensity-associated event occurs, the buyer terminal may transmit the acquired identification information to the server system. Since the description made with reference to FIGS. 2A through 3C is also applicable here, repeated description will be omitted. In the example illustrated in FIG. 9, the identification information acquired by the buyer terminal may be "12345".

In operation 919, the server system determines whether the identification information acquired by the buyer terminal is valid. When the identification information acquired by the buyer terminal is invalid, the server system performs an error processing in operation 921. When the identification information acquired by the buyer terminal is valid, the server system maps the identification information acquired by the buyer terminal and the dynamic code information in operation 920. For example, the server system may map the identification information "12345" acquired by the buyer terminal and the dynamic code information "ABC", and record "12345"-"ABC" in a database or a mapping table.

In operation 922, the seller terminal requests the server system for transaction authentication. The seller terminal may transmit merchant information and/or transaction amount information to the server system together with the transaction authentication request.

In operation 923, the server system determines a mapping counterpart of the identification information issued for the seller terminal by referencing a mapping table. Specifically, in response to the transaction authentication request from the seller terminal, the server system may determine whether at least one item of "identification information acquired by the buyer terminal" recorded in the mapping table matches the identification information issued for the seller terminal. When the acquired identification information matches the issued identification information, the server system may determine dynamic code information mapped to the identification information acquired by the buyer terminal, to be a mapping counterpart of the identification information issued for the seller terminal. For example, the server system may determine whether the identification information "12345" assigned for the seller terminal matches at least one item of "the identification information acquired by the buyer terminal". Since "12345" is recorded in the mapping table, the server system may determine "ABC" mapped to "12345" in the mapping table, to be the mapping counterpart of the identification information issued for the seller terminal the seller terminal.

When the dynamic code information mapped to the identification information acquired by the buyer terminal is determined as the mapping counterpart of the identification information issued for the seller terminal, the server system may transmit a payment request generated based on one-time information corresponding to the dynamic code information determined as the mapping counterpart, the merchant information, and the payment amount information, to a card company server through a VAN company server. The card company server may process the payment request and transmit a processing result to the server system through the VAN company server. The server system may transmit the processing result to the seller terminal. Through this, the payment may be completed.

Figure 10:
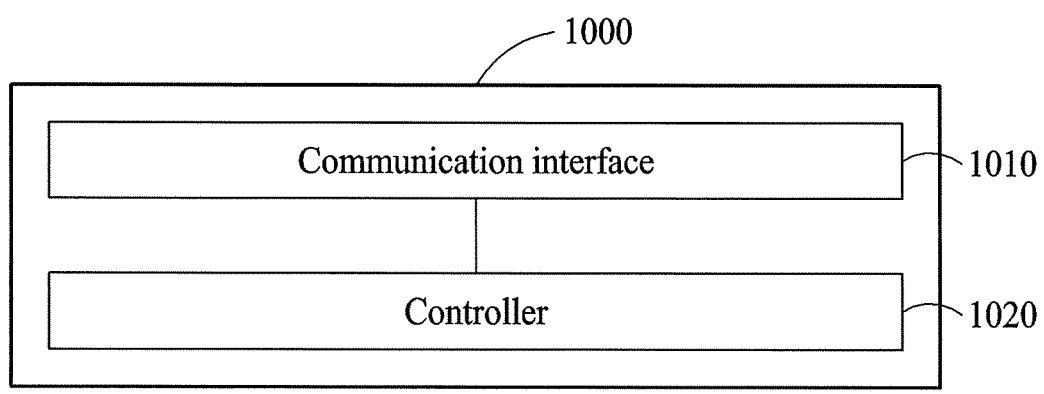
FIG. 10 is a block diagram illustrating a service server according to an example embodiment.

FIG. 10 is a block diagram illustrating a service server according to an example embodiment.

Referring to FIG. 10, a service server 1000 includes a communication interface 1010 and a controller 1020. The service server 1000 may correspond to the service server described with reference to FIGS. 1 through 9.

The communication interface 1010 may perform wired and/or wireless communication.

The controller 1020 receives identification information acquired by the buyer terminal and dynamic code information generated in response to a request from the buyer terminal, from a payment application server through the communication interface 1010.

The controller 1020 determines whether the acquired identification information is valid and maps the identification information and the dynamic code information based on a determination result.

The controller 1020 records the mapped identification information and dynamic code information in a database or a mapping table.

The controller 1020 transmits mapping information to the payment application server through the communication interface 1010 such that a payment processing is performed by the payment application server having received a transaction authentication request from a seller terminal. Here, the mapping information may be generated based on the mapping of the identification information and the dynamic code information.

Since the communication interface 1010 and the controller 1020 may perform the operations of the service server described with reference to FIGS. 1 through 9, repeated description will be omitted.

When a sound wave intensity-associated event and/or a magnetic field intensity-associated event occurs, the buyer terminal may transmit, to the payment application server, identification information acquired based on a sound wave output from the seller terminal. The payment application server may transmit the identification information to the service server 1000. For example, when a value of an intensity of the sound wave output from the seller terminal is greater than or equal to a threshold sound-wave intensity value, the buyer terminal may transmit the identification acquired based on the sound wave to the payment application server. In this example, another buyer terminal having received a sound wave of which a value of an intensity is less than the threshold sound-wave intensity value may not transmit identification information acquired based on the sound wave to the payment application server.

Figure 11:
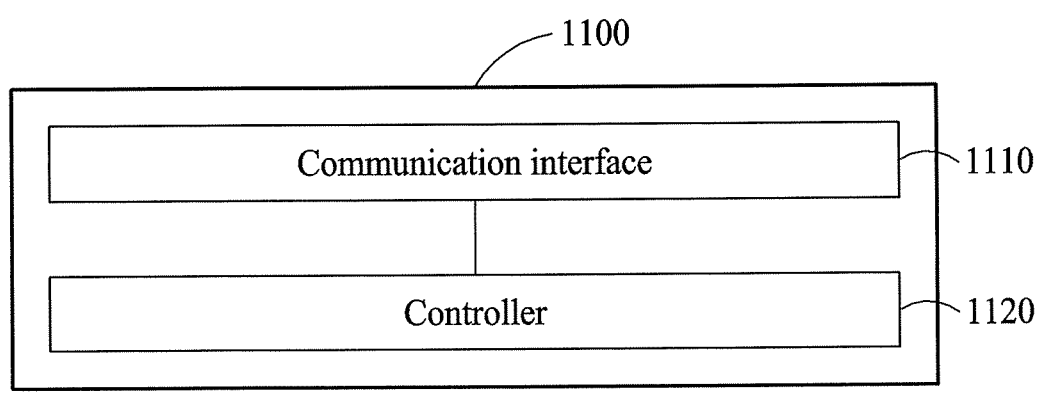
FIG. 11 is a block diagram lustrating a payment application server according to an example embodiment.

FIG. 11 is a block diagram illustrating a payment application server according to an example embodiment.

Referring to FIG. 11, a payment application server 1100 includes a communication interface 1110 and a controller 1120.

The communication interface 1110 may perform wired and/or wireless communication.

When selected information is received from a buyer terminal through the communication interface 1110, the controller 1120 generates dynamic code information.

When an identification information provision request of a seller terminal is received, the controller 1120 transmits the identification information provision request to a service server through the communication interface 1110.

The controller 1120 receives identification information issued for the seller terminal from the service server through the communication interface 1110 and transmits the issued identification information to the seller terminal through the communication interface 1110.

The controller 1120 receives identification information acquired by the buyer terminal based on a sound wave, from the buyer terminal through the communication interface 1110.

The controller 1120 transmits the dynamic code information and the identification information acquired by the buyer terminal to the service server through the communication interface 1110.

The controller 1120 receives mapping information from the service server through the communication interface 1110.

The controller 1120 receives a transaction authentication request from the seller terminal through the communication interface 1110.

When the transaction authentication request and the mapping information are received, the controller 1120 performs a payment processing.

Since the communication interface 1110 and the controller 1120 may perform the operations of the payment application server described with reference to FIGS. 1 through 9, repeated description will be omitted.

Figure 12:
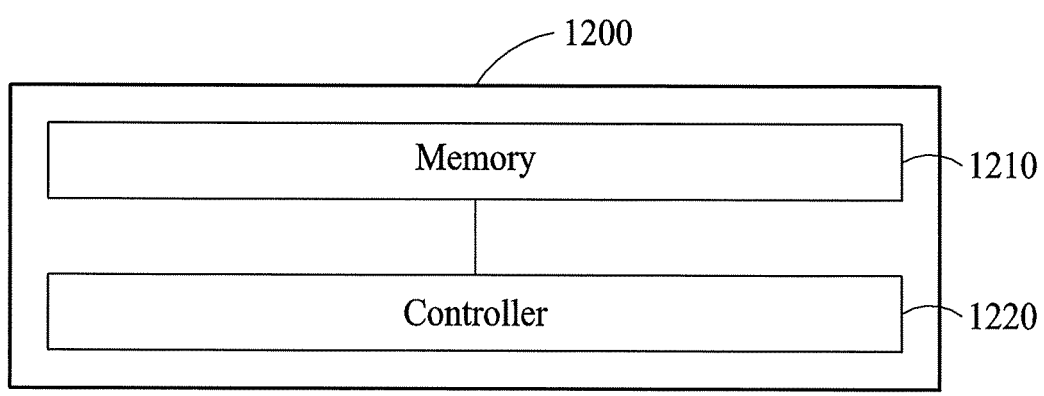
FIG. 12 is a block diagram illustrating a buyer terminal according to an example embodiment.

FIG. 12 is a block diagram illustrating a buyer terminal according to an example embodiment.

A buyer terminal may include a mobile terminal.

Referring to FIG. 12, a buyer terminal 1200 includes a memory 1210 and a controller 1220.

The memory 1210 stores a payment application.

The controller 1220 executes the payment application. In response to the payment application being executed, the controller 1220 may operate as follows.

When a card registered on the payment application is selected as a payment method, the controller 1120 transmits selection information to a payment application server through a communication interface.

The controller 1220 may receive dynamic code information from the payment application server through the communication interface. The controller 1220 may display the dynamic code information on a display of the buyer terminal 1200.

The controller 1220 may enter a sound wave receiving mode. For example, when the payment application is executed, or when the dynamic code information is received, the controller 1220 may enter the sound wave receiving mode. In the sound wave receiving mode, a microphone of the buyer terminal 1200 may be activated.

The controller 1220 acquires identification information based on a sound wave output from a seller terminal and transmits the acquired identification information to the payment application server through the communication interface. For example, when a sound wave intensity-associated event and/or a magnetic field intensity-associated event occurs, the controller 1220 may acquire identification information based on a sound wave and transmit the acquired identification information to the payment application server through the communication interface. Depending on an implementation, the controller 1220 may acquire identification information based on a sound wave, and then, when a sound wave intensity-associated event and/or a magnetic field intensity-associated event occurs, may transmit the acquired identification information to the payment application server through the communication interface.

Since the memory 1210 and the controller 1220 may perform the operations of the buyer terminal described with reference to FIGS. 1 through 9, repeated description will be omitted.

Figure 13:
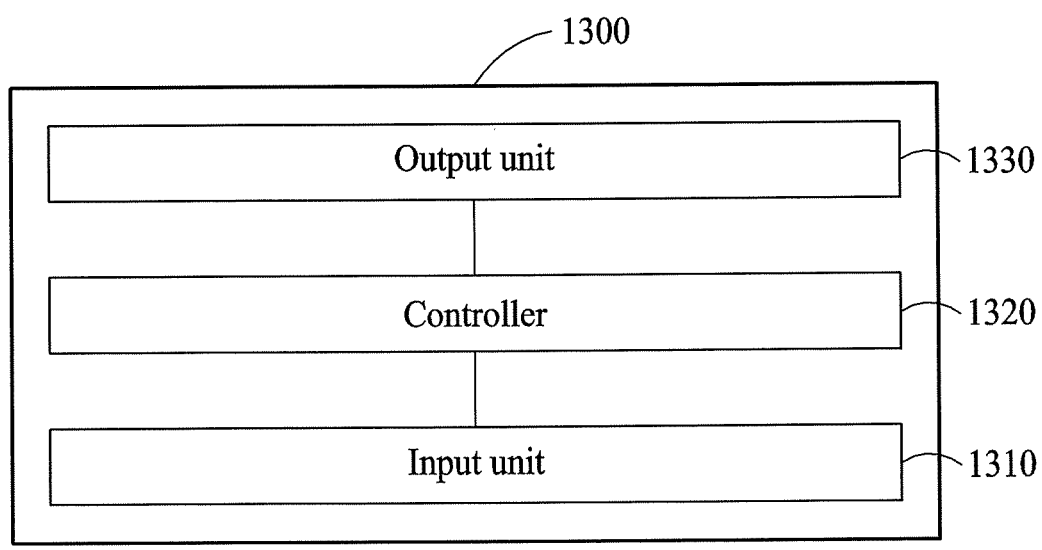
FIG. 13 is a block diagram illustrating a seller terminal according to an example embodiment.

FIG. 13 is a block diagram illustrating a seller terminal according to an example embodiment.

A seller terminal may include a point of sale (POS) terminal.

Referring to FIG. 13, a seller terminal 1300 includes an input unit 1310, a controller 1320, and an output unit 1330.

The input unit 1310 generates sales information. For example, the input unit 1310 may include a reader (or scanner) and generate sales information of an item by scanning a barcode of the item through the reader.

The input unit 1310 may select a payment method.

The controller 1320 requests a payment application server to provide identification information through a communication interface. The controller 1320 receives identification information issued for the seller terminal 1300 from the payment application server through the communication interface. The controller 1320 generates a sound wave based on the issued identification information.

The output unit 1330 may output the sound wave. For example, the output unit 1330 may include a speaker and output the sound wave through the speaker.

The controller 1320 transmits a transaction authentication request to the payment application server through the communication interface.

The controller 1320 receives a response to the transaction authentication request from the payment application server through the communication interface.

Since the input unit 1310, the controller 1320, and the output unit 1330 may perform the operations of the seller terminal described with reference to FIGS. 1 through 9, repeated description will be omitted.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or n a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The methods according to the above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

The invention claimed is:

1. A method of operating a service server, the method comprising:
   issuing identification information of a seller terminal in a payment when an identification information provision request of the seller terminal is received from a payment application server, wherein different identification information is issued to the seller terminal in a different payment;
   recording the issued identification information in a list;
   transmitting the issued identification information to the payment application server, wherein the payment application server is configured to transmit the issued identification information to the seller terminal such that the seller terminal generates a sound wave based on the issued identification information;
   receiving, from the payment application server, identification information acquired based on the sound wave by a buyer terminal and dynamic code information of the buyer terminal, wherein the buyer terminal is configured to transmit the acquired identification information to the payment application server;
   determining whether the acquired identification information is valid;
   mapping the acquired identification information and the dynamic code information based on a result of the determining; and
   transmitting, to the payment application server, mapping information generated based on the mapping such that a payment processing is performed by the payment application server having received a transaction authentication request from the seller terminal,
   wherein the determining whether the acquired identification information is valid comprises determining whether the acquired identification information is issued by the service server based on the list.

2. The method of claim 1, wherein when the transaction authentication request, merchant information, and transaction amount information are received from the seller terminal, the payment application server is configured to generate a payment request based on one-time information corresponding to the dynamic code information in the mapping information, the merchant information, and the transaction amount information.

3. The method of claim 1, further comprising:
   transmitting, to the payment application server, a security key used for shuffling a sequence corresponding to the sound wave.

4. The method of claim 3, wherein the payment application server is configured to transmit the security key to the seller terminal.

5. The method of claim 1, further comprising:
   generating, when identification information for the seller terminal is issued, a sequence including the issued identification information and shuffling the sequence using a security key shared with the buyer terminal; and
   transmitting the shuffled sequence to the payment application server.

6. The method of claim 1, wherein the buyer terminal is configured to determine a sequence corresponding to the sound wave, shuffle the sequence using a security key shared with the service server, and acquire identification information from the shuffled sequence.

7. A service server comprising:
   a communication interface; and
   a controller coupled to the communication interface,
   wherein the controller is configured to:
   issue identification information of a seller terminal in a payment when an identification information provision request of the seller terminal is received from a payment application server, wherein different identification information is issued to the seller terminal in a different payment;

record the issued identification information in a list;

transmit, via the communication interface, the issued identification information to the payment application server, wherein the payment application server is configured to transmit the issued identification information to the seller terminal such that the seller terminal generates a sound wave based on the issued identification information receive, from a payment application server via the communication interface, identification information acquired based on the sound wave by a buyer terminal and dynamic code information of the buyer terminal, wherein the buyer terminal is configured to transmit the acquired identification information to the payment application server, determine whether the acquired identification information is valid, map the acquired identification information and the dynamic code information based on a result of the determining, and transmit, to the payment application server via the communication interface, mapping information generated based on the mapping such that a payment processing is performed by the payment application server having received a transaction authentication request from the seller terminal, wherein, for determining whether the acquired identification information is valid, the controller is configured to determine whether the acquired identification information is issued by the service server based on the list.

8. The service server of claim 7, wherein when the transaction authentication request, merchant information, and transaction amount information are received from the seller terminal, the payment application server is configured to generate a payment request based on one-time information corresponding to the dynamic code information in the mapping information, the merchant information, and the transaction amount information.

9. The service server of claim 7, wherein the controller is configured to transmit a security key used for shuffling a sequence corresponding to the sound wave, to the payment application server via the communication interface.

10. The service server of claim 9, wherein the payment application server is configured to transmit the security key to the seller terminal.

11. The service server of claim 7, wherein when identification information for the seller terminal is issued, the controller is configured to generate a sequence including the issued identification information, shuffle the sequence using a security key shared with the buyer terminal, and transmit the shuffled sequence to the payment application server.

12. The service server of claim 7, wherein the buyer terminal is configured to determine a sequence corresponding to the sound wave, shuffle the sequence using a security key shared with the service server, and acquire identification information from the shuffled sequence.

* * * * *